(12) United States Patent
Strzala (10) Patent No.: US 11,725,706 B2
(45) Date of Patent: Aug. 15, 2023

(54) DEVICE FOR RECOGNIZING WEAR OF A BRAKE PAD OF A DISC BRAKE

(71) Applicant: ZF CV Systems Europe BV, Brussels (BE)

(72) Inventor: Wieslaw Strzala, Byczyna (PL)

(73) Assignee: ZF CV Systems Europe BV, Brussels (BE)

( * ) Notice: Subject to any disclaimer, the term of this patent is extended or adjusted under 35 U.S.C. 154(b) by 0 days.

(21) Appl. No.: 17/494,196

(22) Filed: Oct. 5, 2021

(65) Prior Publication Data

US 2022/0106995 A1 Apr. 7, 2022

(30) Foreign Application Priority Data

Oct. 6, 2020 (EP) ..................................... 20200267

(51) Int. Cl.
*F16D 66/02* (2006.01)
*F16D 66/00* (2006.01)

(52) U.S. Cl.
CPC ...... *F16D 66/024* (2013.01); *F16D 2066/001* (2013.01)

(58) Field of Classification Search
CPC .......................... F16D 66/024; F16D 2066/001
See application file for complete search history.

(56) References Cited

U.S. PATENT DOCUMENTS

| | | | | |
|---|---|---|---|---|
| 3,886,517 A | * | 5/1975 | Ohtake | F16D 66/024 340/459 |
| 3,976,167 A | * | 8/1976 | Hirai | F16D 65/0975 188/1.11 R |
| 4,016,533 A | | 4/1977 | Ishikawa et al. | |
| 4,318,457 A | * | 3/1982 | Dorsch | F16D 66/024 340/454 |
| 4,646,001 A | * | 2/1987 | Baldwin | F16D 66/027 188/1.11 R |
| 5,015,990 A | * | 5/1991 | Reede | F16D 66/024 188/DIG. 1 |
| 5,608,376 A | * | 3/1997 | Ito | F16D 66/027 200/61.4 |
| 5,637,794 A | * | 6/1997 | Hanisko | F16D 66/026 374/E1.008 |
| 5,833,033 A | * | 11/1998 | Takanashi | F16D 66/024 188/1.11 E |
| 5,909,171 A | * | 6/1999 | Kyrtsos | F16D 66/00 188/1.11 R |
| 5,939,978 A | * | 8/1999 | Kyrtsos | F16D 66/024 188/1.11 R |

(Continued)

FOREIGN PATENT DOCUMENTS

| | | |
|---|---|---|
| DE | 102010048988 A1 | 4/2012 |
| EP | 0464347 A1 | 1/1992 |
| EP | 0602866 A1 | 6/1994 |

*Primary Examiner* — Thomas W Irvin
(74) *Attorney, Agent, or Firm* — Dickinson Wright PLLC (57) ABSTRACT

A wear indication device (10) for a vehicle brake (1), preferably a disc brake of a commercial vehicle, for indicating a wear condition of a brake pad (20) comprising: a fixing section (12) for fixing the wear indication device (10) to a brake pad back plate (30), a sensor head (14) associated to the fixing section (12), and a channel (16) for receiving a signal cable (40) within the sensor head (14). According to the invention, the channel (16) is configured to receive two signal cables (40', 40").

17 Claims, 6 Drawing Sheets

(56) References Cited

U.S. PATENT DOCUMENTS

| | | | | |
|---|---|---|---|---|
| 6,095,290 A * | 8/2000 | Takanashi | | F16D 66/024 188/1.11 E |
| 6,158,275 A * | 12/2000 | Asao | | F16D 66/024 73/121 |
| 6,179,091 B1 * | 1/2001 | Takanashi | | F16D 66/024 188/1.11 L |
| 6,290,027 B1 * | 9/2001 | Matsuzaki | | F16D 66/024 188/1.11 E |
| 6,338,397 B1 * | 1/2002 | Gezgin | | B60T 17/221 188/1.11 E |
| 6,360,850 B1 * | 3/2002 | Odisho | | F16D 66/026 340/454 |
| 6,415,658 B1 * | 7/2002 | Takanashi | | F16D 66/024 73/121 |
| 6,450,300 B1 * | 9/2002 | Kramer | | G01K 13/08 374/E13.01 |
| 6,477,893 B1 * | 11/2002 | Djordjevic | | F16D 66/02 73/129 |
| 6,719,102 B2 * | 4/2004 | Takanashi | | F16D 66/024 188/1.11 W |
| 7,165,657 B2 * | 1/2007 | Palladino | | F16D 66/026 188/1.11 E |
| 9,045,122 B2 * | 6/2015 | Bosis | | F16D 66/024 |
| 9,074,647 B2 * | 7/2015 | Stumpf | | F16D 66/024 |
| 2007/0131491 A1 * | 6/2007 | Cory | | F16D 66/024 188/1.11 L |
| 2010/0253497 A1 * | 10/2010 | Bakker | | F16D 66/027 340/454 |
| 2013/0306410 A1 * | 11/2013 | Stumpf | | F16D 66/024 188/1.11 L |
| 2014/0245824 A1 * | 9/2014 | Bosis | | B60T 17/18 73/129 |
| 2015/0369318 A1 * | 12/2015 | Kang | | F16D 66/024 188/1.11 L |

\* cited by examiner

State of the art

Fig. 5

State of the art

Fig. 6

DEVICE FOR RECOGNIZING WEAR OF A BRAKE PAD OF A DISC BRAKE

FIELD

The invention relates to a wear indication device for a vehicle brake, preferably a disc brake of a commercial vehicle, for indicating a wear condition of a brake pad. The invention further relates to a vehicle brake, preferably a disc brake of a commercial vehicle, having a brake pad back for carrying the brake pad.

BACKGROUND

Disc brakes for use in vehicles are generally known. To generate a braking force, brake shoes, which include a brake pad back plate and a brake pad, are pressed against a brake disc. This contact causes the brake pad to wear over time.

It is well known that electrical contact conductors, such as cables, may be arranged in the brake pad in order to monitor the thickness of the brake pad, in particular to determine whether the brake pad falls below an allowable wear limit. The brake pad may have a cut-out for the arrangement of a sensor head within the brake pad. When the wear limit is reached, the contact conductor comes into contact with the brake disc during braking, and is also grinded. This contact causes an electrical signal to be sent to a signal transmitter, and a warning signal is generated.

For example, such a device is described in DE 10 2010 048 988 A1. Here, two channels are arranged within a sensor head to receive a U-shaped contact loop of a signal cable. However, this arrangement is disadvantageous because the sensor head is susceptible to damage.

SUMMARY

Therefore, it was an object of the invention to provide a wear indication device that overcomes at least some of the above-mentioned issues. In particular, it was an object of the invention to provide a wear indication device that is simple in design and at the same time robust and damage-resistant.

In one aspect, the wear indication device includes a fixing section for fixing the wear indication device to a brake pad back plate, a sensor head associated with the fixing section, and a channel for receiving a signal cable within the sensor head.

According to one aspect, the channel is configured to receive two signal cables. According to one aspect, the term two cables may also be understood as two cable sections of a single cable, for example in the case of a U-shaped contact loop of a cable.

According to a preferred embodiment, the channel is a double channel having a first section for the first cable and a second section for the second cable, wherein the first and second sections are positioned adjacent to each other radially with respect to their center axis. The radial direction is a direction orthogonal to the center axis. The first and second section of the channel serve to arrange both cables together in the channel, but at least partially separated from each other in such a way that each cable is allocated in a separate section.

Preferably, the center axis of the first signal cable has a distance to the fixing section that is greater than a distance between the center axis of the second signal cable and the fixing section. If both cables (sections) would have the same distance from the fixing section, i.e. their central axes were arranged in a plane parallel to the plane of the brake disc when installed, both cables (sections) would be ground on and off together after reaching the wear limit. In such a case, it can happen that both cables lose the holding contact at the same time and are either destroyed by the brake disc or do not come into contact with the brake disc at all. This would result in incorrect information and a diagnosis of functionality would be impossible.

Preferably, the respective cross-sections of the first and the second sections at least partially overlap, such that the channel has a narrow necking area partly separating the first section from the second section by way of at least one protrusion, preferably two opposing protrusions in the sensor head projecting inwardly into the double channel. In this way it is possible to position the two cables on the one hand as close to each other as possible and on the other hand separately from each other in different sections. The task of the sensor is to emit a signal as soon as one of the cables, preferably the upper cable or that cable which has the smallest axial distance to the brake disc when installed, is exposed and comes into contact with the brake disc. This is the case when the sensor head is ground down so that the first section of the double channel is exposed. By way of the protrusion, it is possible to keep the second cable within the second section without it slipping out of its position within the second section when the first section is exposed. The term axial refers to an axial direction or an axial axis of the wear indication device. It is defined as an axis orthogonal to a zero plane, wherein the zero plane represents a contact surface between the brake pad back plate and the wear indication device when installed and wherein the zero plane is a plane parallel to the brake disc. Unless otherwise defined below, this definition applies.

According to yet another embodiment, the first section and/or the second section of the double channel has at least a partly circular cross-section. The inner contour of the channel preferably matches the outer contour of the cables. In particular, the inner contour of the first section may have a contour corresponding to the outer contour of the cross-sectional area of first cable and the inner contour of the second section may have a contour corresponding to the outer contour of the cross-sectional area of the second cable.

According to yet another preferred embodiment, the double channel has a geometry such that the two signal cables are arranged at least partially in parallel to each other, in direct contact or at a distance from each other, within the channel. It is preferable, when arranging the cables inside the sensor head, to keep the axial distance between the cables as small as possible.

Preferably, the wear indication device further includes a substantially flat contact surface for contacting a brake pad back plate when the wear indication device is installed, the contact surface defining a zero plane having an axial axis orthogonal to the plane. The sensor device of the invention determines a wear limit of the brake pad. This wear limit is defined by a plane essentially parallel to the zero plane. An indicator that the wear limit has been reached occurs at contact between brake disc and one of the cables (or sections). For this reason a precise arrangement of the sensor device is desirable to achieve a representative output value. Due to not completely plane-parallel removal of the brake pad, at least a partial routing of the cable or a portion of the cable within this wear limit plane is reasonable. It should be understood that the cable routing described in this section also defines that cable section within the sensor head that is axially most distant from the zero plane, therefore axially closest to the brake disc when installed.

According to a preferred embodiment, the channel has a geometry such that the two signal cables are arranged within the channel perpendicular to the axial axis of the brake. Preferably, the center axis of the first signal cable has a distance to the zero plane that is greater than a distance between the center axis of the second signal cable and the zero plane, the distance to the zero plane being in the direction of the axial axis of the brake. In one aspect, the center axes of the first and second signal cables define a plane perpendicular to the zero plane. This arrangement of the defined plane is for the same reason as mentioned in the preceding paragraph(s), i.e. to keep the axial space used by the cables small, and at the same time providing an extended length of routing in the wear limit plane, and to hold at least one cable section in the channel when the other one has been contacted and ground. In another embodiment, the double channel can be arranged such that the center axes of the first and second signal cables define a plane arranged at an angle less than 90° to the zero plane. Preferably, the center axes of the first and second cable, as mentioned in this paragraph, extends at least partially parallel to the zero plane or perpendicular to the axial axis.

In one aspect, the channel and the signal cables extend at least partially parallel to the zero plane. This extension is for the same reason as mentioned in the preceding paragraphs. In addition, a parallel routing of the signal cables has a positive effect on reducing the space of the channel taken up in the axial direction.

According to yet another aspect, the channel has a geometry such that the two signal cables are in contact, such that they have the smallest possible distance from each other within the channel. As mentioned in the above paragraph, it is important to use reduced space in the axial direction, as this also reduces the axial distance between the wear limit and the zero plane. As a result, the removal volume of the brake pad can be increased until the wear limit is reached, which is defined by the position of the cable (section) that is axially the furthest from the zero plane.

Preferably, the sensor head is formed of a plastic material. The wear indication device is exposed to extreme temperatures during operation. The materials used for this purpose (for example plastic) must therefore be of high quality.

In another aspect, the objective of the invention is solved by a vehicle brake, preferably a disc brake of a commercial vehicle, the vehicle brake including a wear indication device configured according to one of the above embodiments described above.

It should be understood that the preferred embodiments, aspects, and advantages of the wear indication device are similarly preferred embodiments, aspects, and advantages of the vehicle brake having the wear indication device. In order to avoid repetition, reference may be made to the above description of the wear indication device and the vehicle brake.

In one aspect, the channel is arranged outside the brake pad back plate, and within the brake pad. In this aspect, the wear indication device has a sensor head as well as a fixing section. The fixing section is located within the brake pad back plate and the sensor head is located in a cut-out of the brake pad when installed. This arrangement allows the structural design of the wear indication device to be simplified. In particular, the connecting mechanism that couples the wear indication device to the brake pad back plate can be made more simple and robust if the channel is substantially completely formed within the sensor head, i.e. within the brake pad. The connecting mechanism of the wear indication device to the brake pad back plate should be substantially stable so that the positioning of the cable is reliable and constant. A change in position is undesirable because it may affect the safety signal. For example, a change in position may cause the warning to be given too early or too late.

According to an aspect, an end of the channel closest to the brake pad back plate is located at a distance from the brake pad back plate that is 1 mm or less. As already mentioned, the axial distance of the cables and consequently of the channel to the zero plane are kept small in order to be able to set the wear limit at a low level in the axial direction, i.e. to keep the distance of the wear limit to the zero plane at a low level. This positioning has the advantage of increasing utilization of the brake pad.

According to one aspect, the vehicle brake further includes a brake pad, wherein the wear indication device, in particular the sensor head, is at least partially arranged in a cut-out within the brake pad. This arrangement is necessary at least for the reason that at least one of the cables must be arranged at least partially within the wear limit of the brake pad in order for contact to occur and be detected.

These and other aspects of the disclosure may best be understood from the following detailed description taken in conjunction with the accompanying figures. The figures are schematic and simplified for clarity, and they just show details to improve the understanding of the claims while other details are left out. Throughout, the same reference numerals are used for identical or corresponding parts. The individual features of each aspect may each be combined with any or all features of other aspects.

BRIEF DESCRIPTION OF THE DRAWINGS

These and other aspects, features and/or technical effects will be apparent from and elucidated with reference to the illustrations described hereafter, wherein:

FIG. 3 is a top view an alternative embodiment of a wear indication device according to the concept of the invention in;

DETAILED DESCRIPTION OF THE DRAWINGS

Figure 1:
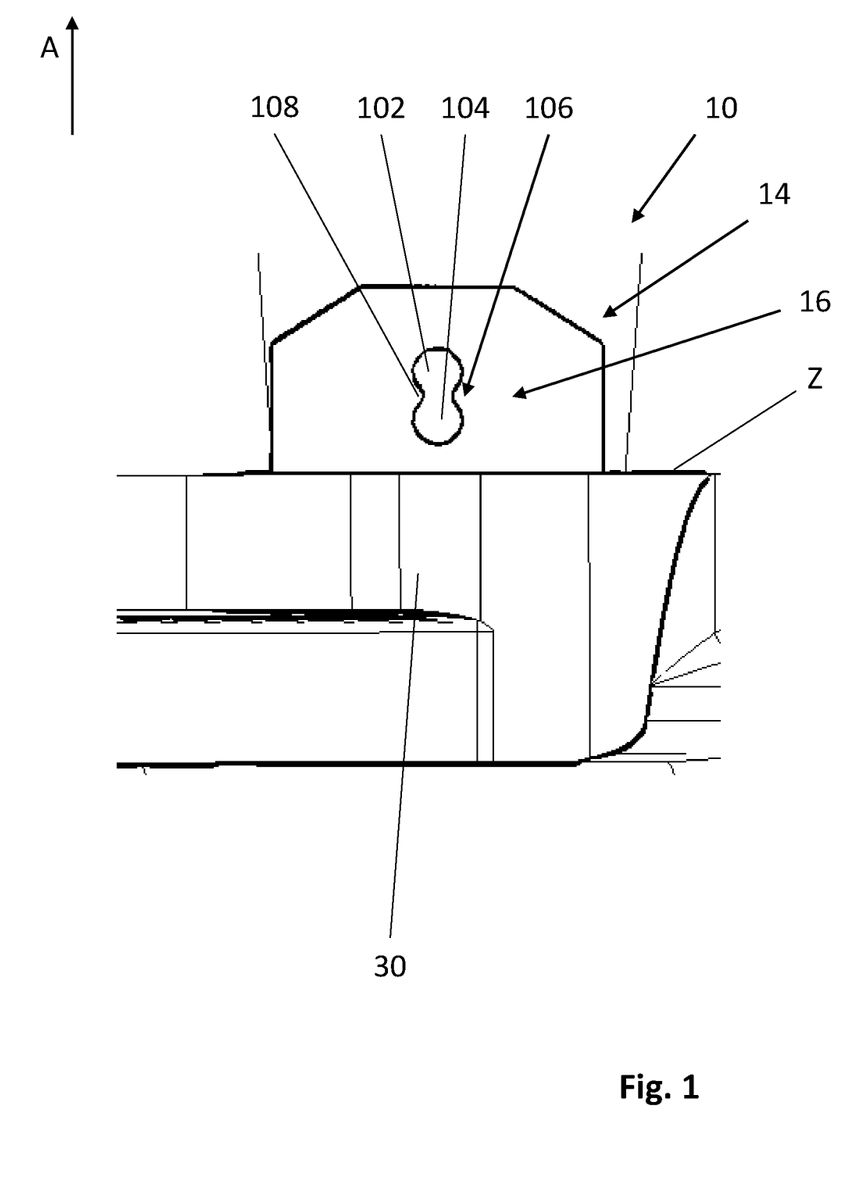
FIG. 1 is a top view of a wear indication device according to the aspect of the disclosure.
Figure 6:
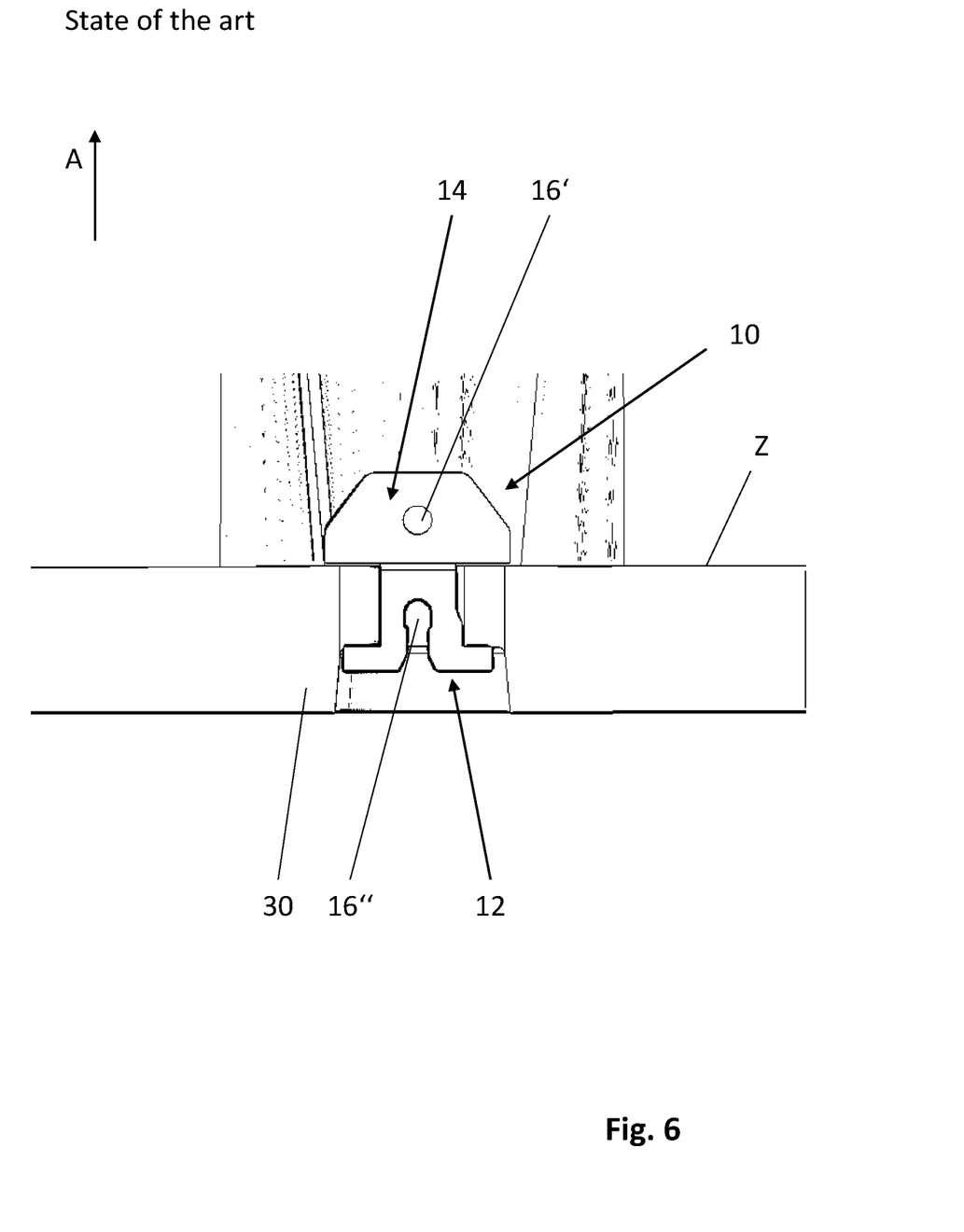
FIG. 6 is a top view of another prior art wear indication device.

FIG. 1 shows a wear indication device 10 in a preferred embodiment for a vehicle brake 1. The wear indication device 10 includes a fixing section 12 (not visible in FIG. 1) which is located inside the brake pad back plate 30 when wear indication device 10 is installed. For reference, FIG. 6 shows a fixing section according to the state of the art. The fixing section 12 is used to fixing the wear indication device 10 to a brake pad back plate 30. The fixing section 12 may take any appropriate shape for this purpose.

The wear indication device 10 further comprises a sensor head 14 and a channel 16 for receiving a signal cable 40 within the sensor head 14. According to the invention, the channel 16 is configured to receive two signal cables 40', 40" (not shown in FIG. 1). An exemplary cable routing is shown in FIG. 4.

Figure 4:
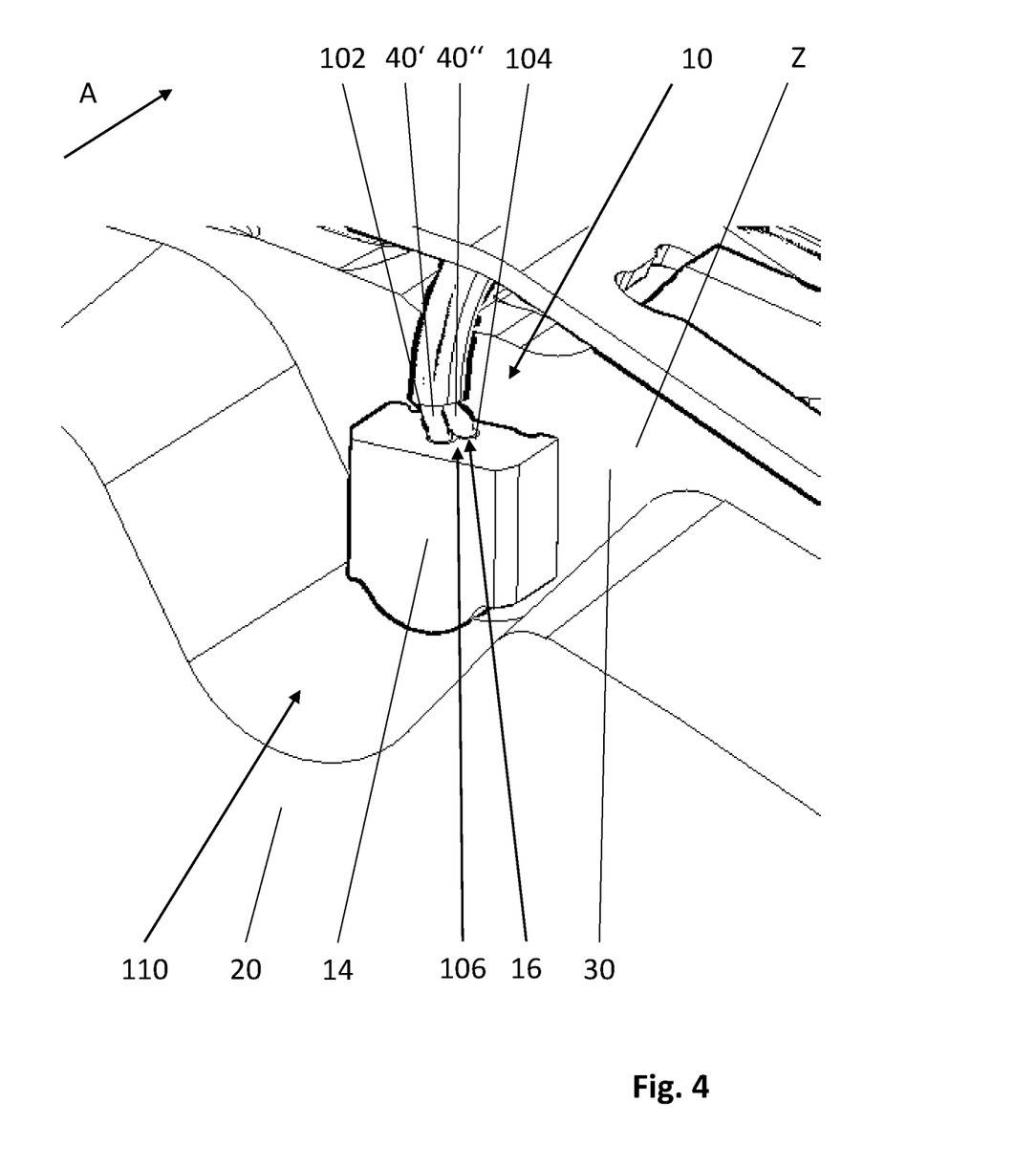
FIG. 4 is a perspective view of the wear indication device disposed in a cut out of a brake pad.

The channel 16 of the wear indication device 10 is a double channel having a first section 102 for a first cable 40', and a second section 104 for a second cable 40", or respectively a first cable section 40' and a second cable section 40" of a signal cable, as best seen in FIG. 4.

In the top view of FIG. 1, it can be seen that the first section 102 of channel 16 has a greater distance in the direction of axis A from the fixing section 12, i.e. in the mounted state from the zero plane Z or brake pad back plate 30, than the second section 104 of channel 16. Put another way, the second section 104 is closer to the back plate 30 than the first section 102.

The double channel also has two opposing protrusions 108. These protrusions 108 are arranged to hold a respective cable section 40', 40" in the respective assigned section 102, 104 of the channel 16. This arrangement is particularly useful if the cable channel 16 has been ground by the brake disc and is thus partially exposed.

In addition, the cross-section of each section 102, 104 of the channel 16 is mostly circular, in order to enclose a corresponding circular cross-section of a signal cable 40. Because the signal cables 40 in the channel 16 can be in contact with each other, the respective sections 102, 104 of the channel 16 overlap at least in part. Therefore, the channel 16 has a narrow necking area 106 partly separating the first section 102 from the second section 104 by way of at least one protrusion 108. Two protrusions 108 are shown, but it will be appreciated that a single protrusion could extend from one side of the channel 16 to define the two sections 102, 104.

The wear indication device 10 further comprises a substantially flat contact surface for contacting a brake pad back plate 30 when the wear indication device 10 is installed, said contact surface defining a zero plane Z. The contact surface defining zero plane Z is located on the back side (back plate side) of the sensor head 14, so that the sensor head 14 is in contact with the zero plane Z or the brake pad back plate 30 when the wear indication device 10 is installed. The zero plane Z thus also defines the interface of the sensor head 14 and the fixing section 12 of the wear indication device 10.

The cables 40, 40' run essentially parallel to each other within the channel 16, or the cable sections 40, 40' of the U-shaped contact loop run parallel to each other, so that they also run parallel to the zero plane Z.

Figure 3:
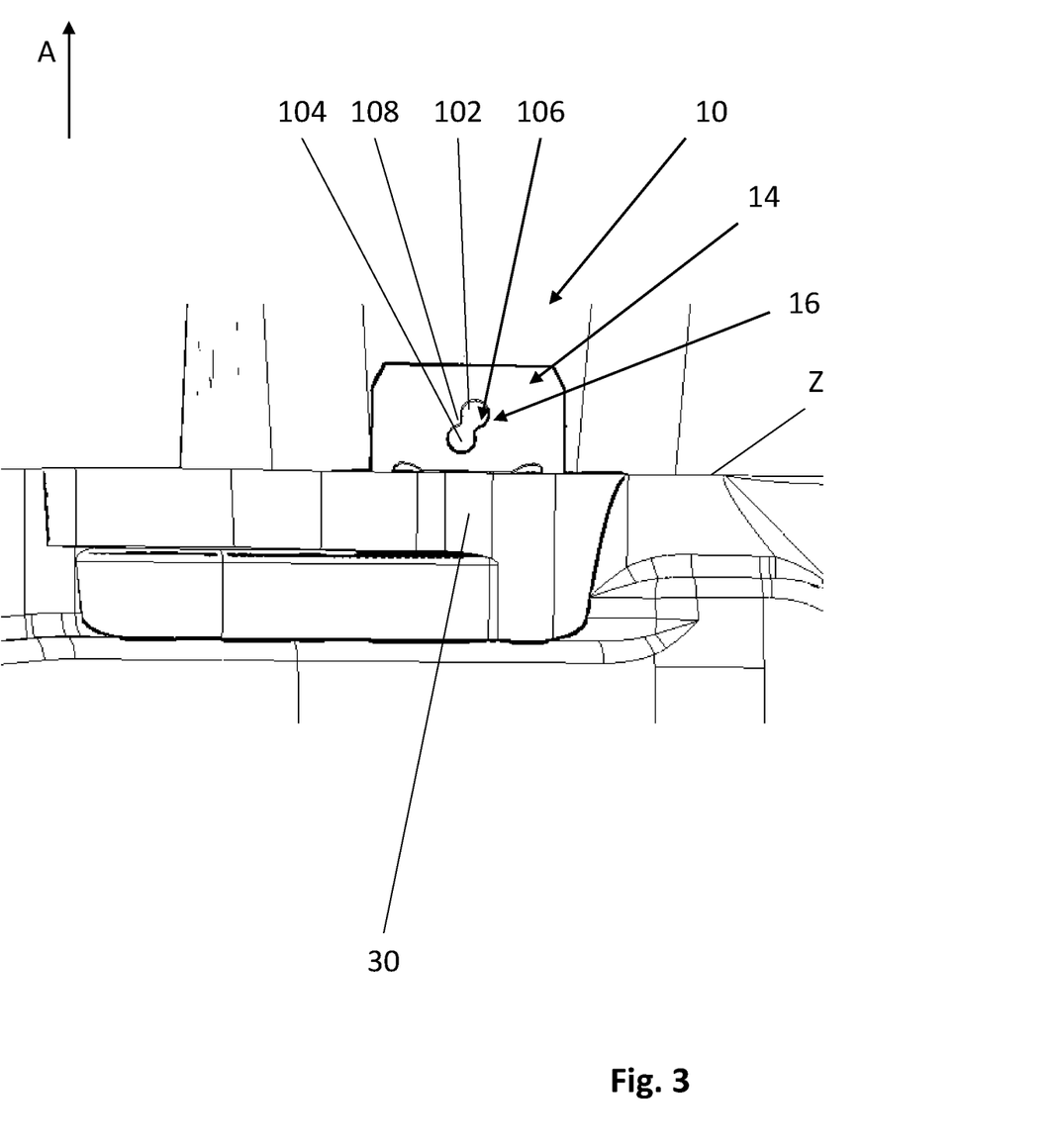

In the embodiment shown in FIG. 1, the sections 102, 104 of the channel 16 are arranged one above the other in the axial direction A, such that the center axes of the first and second signal cables 40', 40", when arranged inside of the double channel of channel 16, define a plane perpendicular to the zero plane (Z). In an alternative embodiment, see FIGS. 3 and 4 for an example, the sections 102, 104 of channel 16 are offset in relation to the axial axis A. In this case, the center axes of the first and second signal cables 40', 40", when arranged inside of the double channel of channel 16, define a plane with an angle smaller than 90° to the zero plane (Z). As can be seen in FIGS. 1, 3 and 4, the cables (or sections) 40, 40' inside the sensor head 14 run parallel to the zero plane Z and perpendicular to the axial axis A.

The cables (or sections) 40, 40' are adjacent to each other within the channel 16, so that the size of channel 16 can therefore correspondingly be small.

Figure 2:
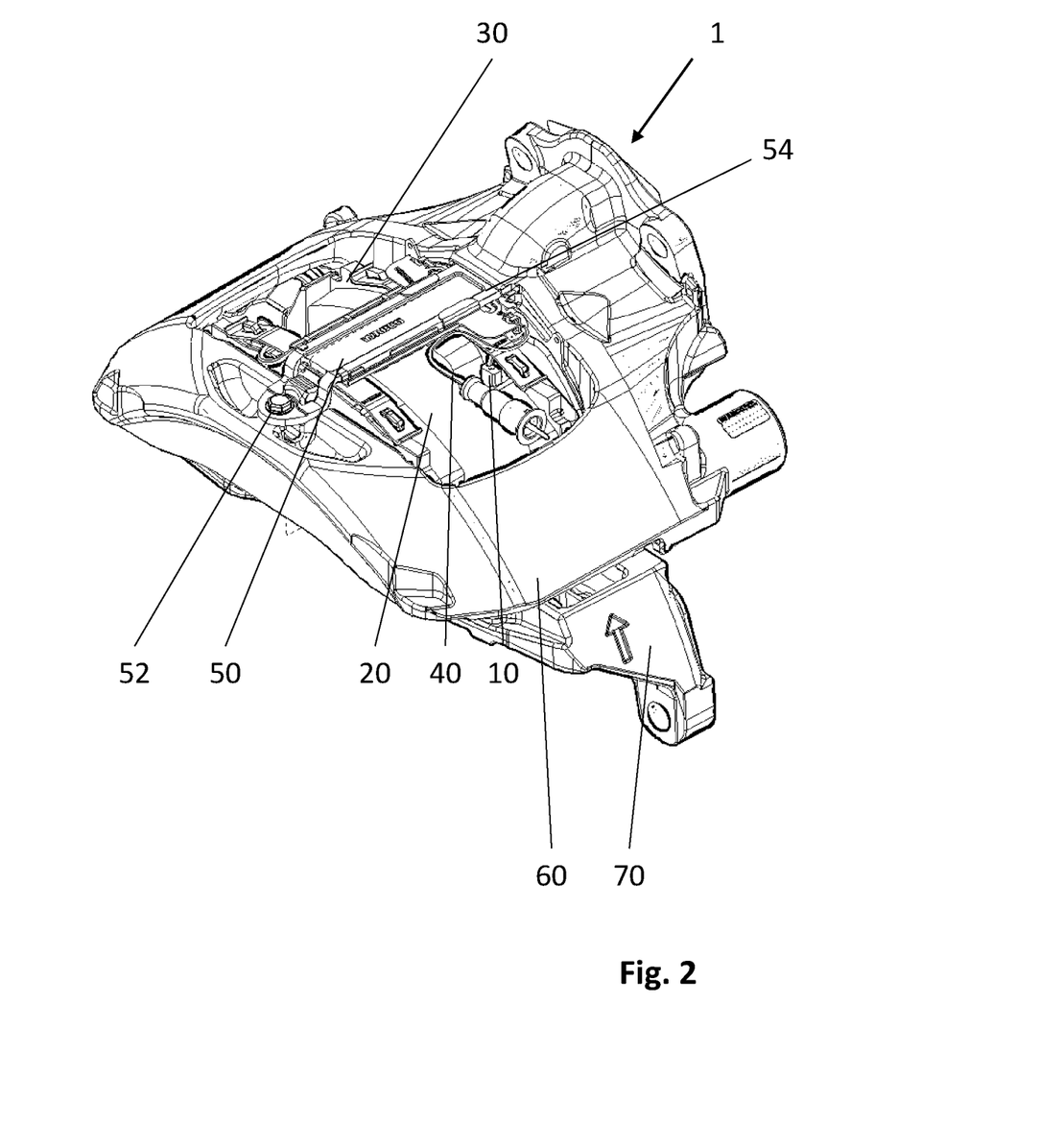
FIG. 2 is a perspective view of a vehicle brake including the wear indication device according to as aspect of the disclosure.

FIG. 2 shows a disc brake 1 including a brake carrier 70, which is mountable to a corresponding receiving section of a vehicle. The disc brake 1 further includes a brake caliper 60, which forms an accommodation space for, among others, brake pad back plate 30, configured to carry a brake pad 20 having a friction lining that comes into contact with the disc of the brake (not shown) during braking in order to apply a braking force.

Further, the brake pad back plate 30 has a wear indication device 10, which is configured to assess the degree of wear of the brake pads 20. The wear indication device 10 is coupled to the brake pad back plate 30 and is at least partly received in a recess (not shown) of the brake pad back plate 30.

The wear indication device 10 is coupled to a signal cable 40 having a connector on its distal end. When the wear indication device 10 is installed, a cable section 40', 40" of the signal cable 40 runs in a U-shaped contact loop through the channel 16 inside the sensor head 14 of the wear indication device 10. Accordingly, the entire cable channel 16 is located at the level of the brake pad 20, as best seen in FIG. 4.

The distance of the lower end of the channel 16, i.e. in particular the distance of the lower end of the second section 104 to the zero plane Z is preferably 1 mm or less.

The brake pad 20 has a cut-out 110 surrounding the recess in which the fixing section 12 is received (see FIG. 4) such that the recess is arranged within the region of the cut-out 110. Thus, the wear indication device 10 is surrounded by the brake pad 20, wherein the cut-out 110 allows an easy access to the wear indication device 10.

The brake pad back plate 30 carrying the brake pad 20 is held in position by a spring hanger 50. The spring hanger 50 is preferably connected to the brake caliper 60 by a spring hanger seat 54 on one side and by a spring hanger fixation means 52 on the other side. After releasing the spring hanger fixation means 52 and guiding the spring hanger 50 out of its seat 54, the spring hanger 50 may be removed. When the spring hanger 50 is removed, the brake pads 20, together with brake pad back plates 30, may be removed likewise and may be exchanged.

Figure 5:
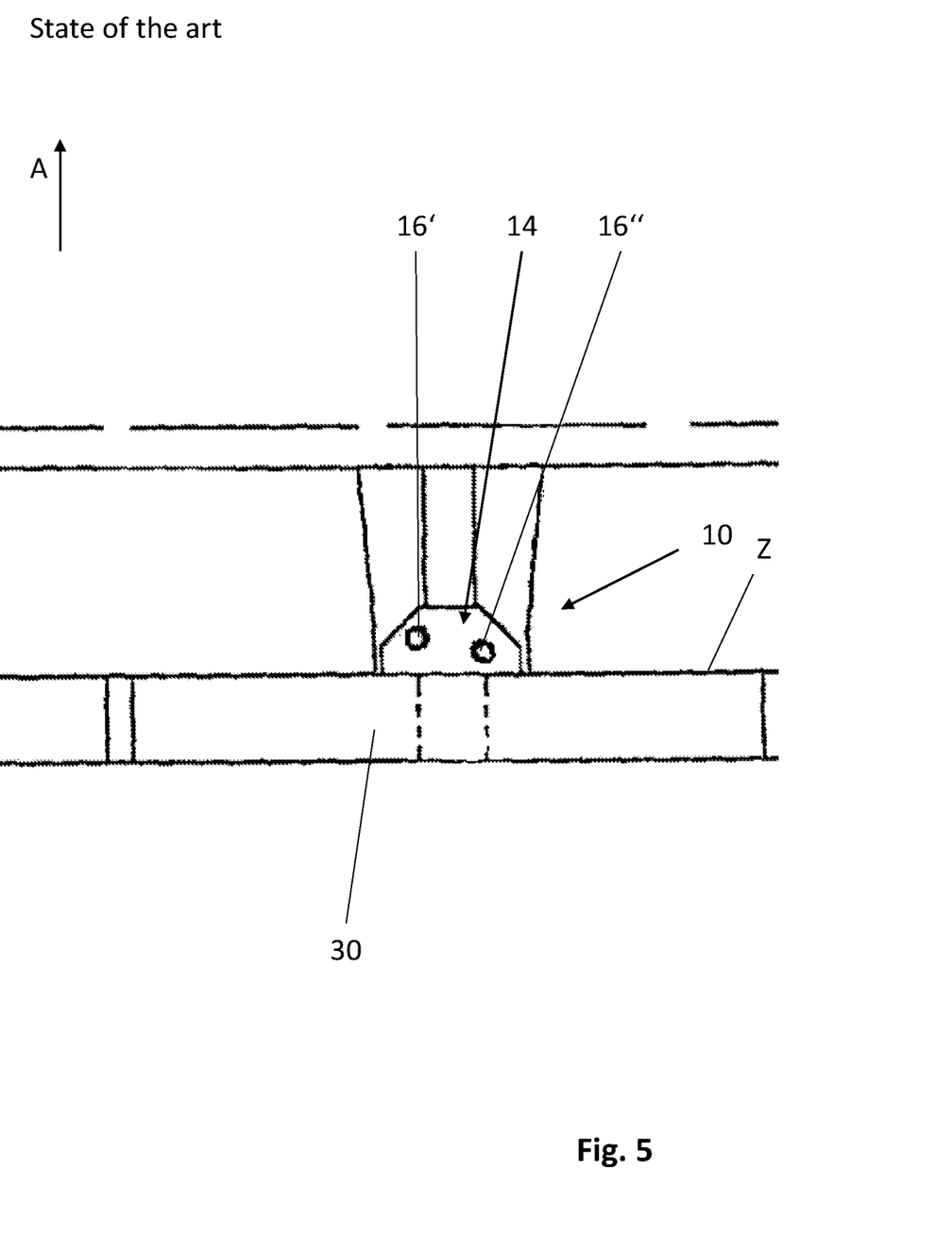
FIG. 5 is a top view of a prior art wear indication device.

FIGS. 5 and 6 show prior art wear indication devices. Here, the signal cable (or sections) 40 are routed along two separate channels 16', 16" within the sensor head 14, as seen in FIG. 5 or with the first channel 16' arranged within the sensor head 14 and the second channel 16" arranged within the fixing section 12, as seen in FIG. 6. The fixing section 12 of the present disclosure may be similar to the fixing sections shown in FIGS. 5 and 6.

It should of course be understood that various modifications and changes in form or detail could readily be made without departing from the scope of the invention. It is therefore intended that the invention may not be limited to the exact form and detail shown and described herein, nor to anything less than the whole of the invention disclosed herein and disclaimed hereinafter. Further, the features described in the description, the drawings and the claims disclosing the invention may be essential for the invention considered alone or in combination. In particular, any reference signs in the claims shall not be construed as limiting the scope of the invention. The word "comprising" does not exclude other elements or steps. The wording "a" or "an" does not exclude a plurality.

What is claimed is:

1. A wear indication device (10) for a vehicle brake (1) for indicating a wear condition of a brake pad (20), the wear indication device comprising:
    a fixing section (12) for fixing the wear indication device (10) to a brake pad back plate (30),
    a sensor head (14) associated with the fixing section (12), and a channel (16) defined within the sensor head (14) for receiving a signal cable (40),
wherein the channel (16) is sized and configured to receive two signal cables (40', 40");
wherein the channel extends fully through the sensor head in a direction parallel to the two signal cables;
wherein the channel (16) is a double channel having a first section (102) for the first cable (40'), and a second section (104) for the second cable (40"), wherein the first and second sections (102, 104) are positioned adjacent to each other radially with respect to center axes thereof; and
wherein the center axis of the first section for the first signal cable (40') has a distance to the fixing section (12) that is greater than a distance between the center axis of the second section for the second signal cable (40") and the fixing section (12).

2. The wear indication device (10) according to claim 1, wherein the respective cross-sections of the first and the second sections (102, 104) at least partially overlap in a direction extending perpendicular to the back plate, such that the channel (16) includes a narrow necking area (106) partly separating the first section (102) from the second section (104) by way of at least one protrusion (108) in the sensor head (14) projecting inwardly into the double channel.

3. The wear indication device (10) according to claim 1, wherein at least one of the first section (102) or the second section (104) of the double channel has at least a partly circular cross-section.

4. The wear indication device (10) according to claim 1, wherein the double channel has a geometry such that the two signal cables (40', 40") are arranged at least partially in parallel to each other in direct contact or at a distance from each other when arranged within the channel (16).

5. The wear indication device (10) according to claim 1, wherein the wear indication device (10) further comprises a substantially flat contact surface for contacting a brake pad back plate (30) when the wear indication device (10) is installed, said contact surface defining a zero plane (Z) having an axial axis (A) orthogonal to the plane.

6. The wear indication device (10) according to claim 5, wherein a center axis of the first signal cable (40') has a distance to the zero plane (Z) that is greater than a distance between the center axis of the second signal cable (40") and the zero plane (Z) in the direction of the axial axis (A) when arranged within the channel.

7. The wear indication device (10) according to claim 5, wherein the center axes of the first and second signal cables (40', 40") define a plane perpendicular to the zero plane (Z) when arranged within the channel.

8. The wear indication device (10) according to claim 5, wherein the channel (16) and the signal cables (40', 40"), when arranged within the channel, extend at least partially parallel to the zero plane (Z).

9. The wear indication device (10) according to claim 1, wherein the channel (16) has a geometry such that the two signal cables (40', 40") are in contact when arranged within the channel, so that the two signal cables have the smallest possible distance from each other within the channel (16).

10. The wear indication device (10) according to claim 1, wherein the sensor head (14) is formed of a plastic material.

11. A wear indication device (10) for a vehicle brake (1) for indicating a wear condition of a brake pad (20), the wear indication device comprising:
a fixing section (12) for fixing the wear indication device (10) to a brake pad back plate (30),
a sensor head (14) associated with the fixing section (12), and
a channel (16) defined within the sensor head (14) for receiving a signal cable (40),
wherein the channel (16) is sized and configured to receive two signal cables (40', 40");
wherein the channel extends fully through the sensor head in a direction parallel to the two signal cables;
wherein the wear indication device (10) further comprises a substantially flat contact surface for contacting a brake pad back plate (30) when the wear indication device (10) is installed, said contact surface defining a zero plane (Z) having an axial axis (A) orthogonal to the plane;
wherein the channel (16) has a geometry such that the two signal cables (40', 40") are arranged perpendicular to the axial axis (A) when arranged within the channel (16).

12. A vehicle brake (1), comprising:
a brake pad back plate (30) for carrying a brake pad (20),
a wear indication device (10) configured for indicating a wear condition of the brake pad (20), the wear indication device (10) including:
a fixing section (12) that fixes the wear indication device (10) to the brake pad back plate (30),
a sensor head (14) associated with the fixing section (12), and
a channel (16) defined within the sensor head (14) for receiving a signal cable (40),
wherein the channel (16) is sized and configured to receive two signal cables (40', 40"), wherein the two signal cables extend through the channel parallel to each other;
wherein the channel extends fully through the sensor head in a direction parallel to the two signal cables;
wherein the channel (16) is arranged outside of the brake pad back plate (30) and within the brake pad (20).

13. The vehicle brake (1) according to claim 12, wherein an end of the channel (16) closest to the brake pad back plate (30) is located at a distance from the brake pad back plate (30) that is 1 mm or less.

14. The vehicle brake (1) according to claim 12, wherein the sensor head (14) is at least partially arranged in a cut-out (110) within the brake pad (20).

15. The vehicle brake (1) according to claim 12, wherein the channel (16) is a double channel having a first section (102) for the first cable (40'), and a second section (104) for the second cable (40"), wherein the first and second sections (102, 104) are positioned adjacent to each other radially with respect to center axes thereof.

16. The vehicle brake (1) according to claim 15, wherein the respective cross-sections of the first and the second sections (102, 104) at least partially overlap in a direction perpendicular to the back plate, such that the channel (16) includes a narrow necking area (106) partly separating the first section (102) from the second section (104) by way of at least one protrusion (108) in the sensor head (14) projecting inwardly into the double channel.

17. The vehicle brake (1) according to claim 15, wherein the center axis of first section for the first signal cable (40') has a distance to the fixing section (12) that is greater than a distance between the center axis of the second section for the second signal cable (40") and the fixing section (12).

* * * * *